(12) United States Patent
Wang et al.

(10) Patent No.: US 11,544,013 B2
(45) Date of Patent: Jan. 3, 2023

(54) ARRAY-BASED COPY MECHANISM UTILIZING LOGICAL ADDRESSES POINTING TO SAME DATA BLOCK

(71) Applicant: DELL PRODUCTS, LP, Round Rock, TX (US)

(72) Inventors: TingWei Wang, Chengdu (CN); Ming Tong, Chengdu (CN); KeCheng Bi, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/324,709

(22) Filed: May 19, 2021

(65) Prior Publication Data
US 2022/0317910 A1 Oct. 6, 2022

(30) Foreign Application Priority Data

Apr. 1, 2021 (CN) .......................... 202110358797.2

(51) Int. Cl.
*G06F 3/06* (2006.01)
(52) U.S. Cl.
CPC ............ *G06F 3/0683* (2013.01); *G06F 3/065* (2013.01); *G06F 3/0613* (2013.01)
(58) Field of Classification Search
CPC .................. G06F 3/0683; G06F 3/0613; G06F 3/0647–065
See application file for complete search history.

(56) References Cited

U.S. PATENT DOCUMENTS

| | | | |
|---|---|---|---|
| 7,356,573 B2 | 4/2008 | Sharma et al. | |
| 2006/0047926 A1 | 3/2006 | Zheng | |
| 2015/0046661 A1* | 2/2015 | Gathala | G06F 12/023 711/147 |
| 2017/0010809 A1* | 1/2017 | Hironaka | G06F 3/0689 |
| 2019/0004964 A1* | 1/2019 | Kanno | G06F 3/0619 |

* cited by examiner

*Primary Examiner* — Chie Yew
(74) *Attorney, Agent, or Firm* — Larson Newman, LLP (57) ABSTRACT

An information handling system includes a first storage array having a first logical block table with logical block addresses. Each logical block address includes a pointer to an associated data block in a first storage volume of the first storage array. The second storage array includes a second logical block table having the logical block addresses and a second storage volume. The first storage array receives a data read command from the second storage array to a first logical block address, and in response to the data read command, determines that a data block pointed to by the first logical block address in the first storage array is also pointed to by second logical block address that is adjacent to the first logical block address in the first logical block table, and sends the data block and metadata to the second storage array, the metadata indicating that the second logical block address points to the data block.

20 Claims, 6 Drawing Sheets

ARRAY-BASED COPY MECHANISM UTILIZING LOGICAL ADDRESSES POINTING TO SAME DATA BLOCK

FIELD OF THE DISCLOSURE

This disclosure generally relates to information handling systems, and more particularly relates to providing an array-based copy mechanism for migration, replication, and backup in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first storage array having a first logical block table with logical block addresses. Each logical block address may include a pointer to an associated data block in a first storage volume of the first storage array. A second storage array may include a second logical block table having the logical block addresses and a second storage volume. The first storage array may receive a data read command from the second storage array to a first logical block address, and in response to the data read command, may determine that a data block pointed to by the first logical block address in the first storage array is also pointed to by second logical block address that is adjacent to the first logical block address in the first logical block table, and send the data block and metadata to the second storage array, the metadata indicating that the second logical block address points to the data block.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

2

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
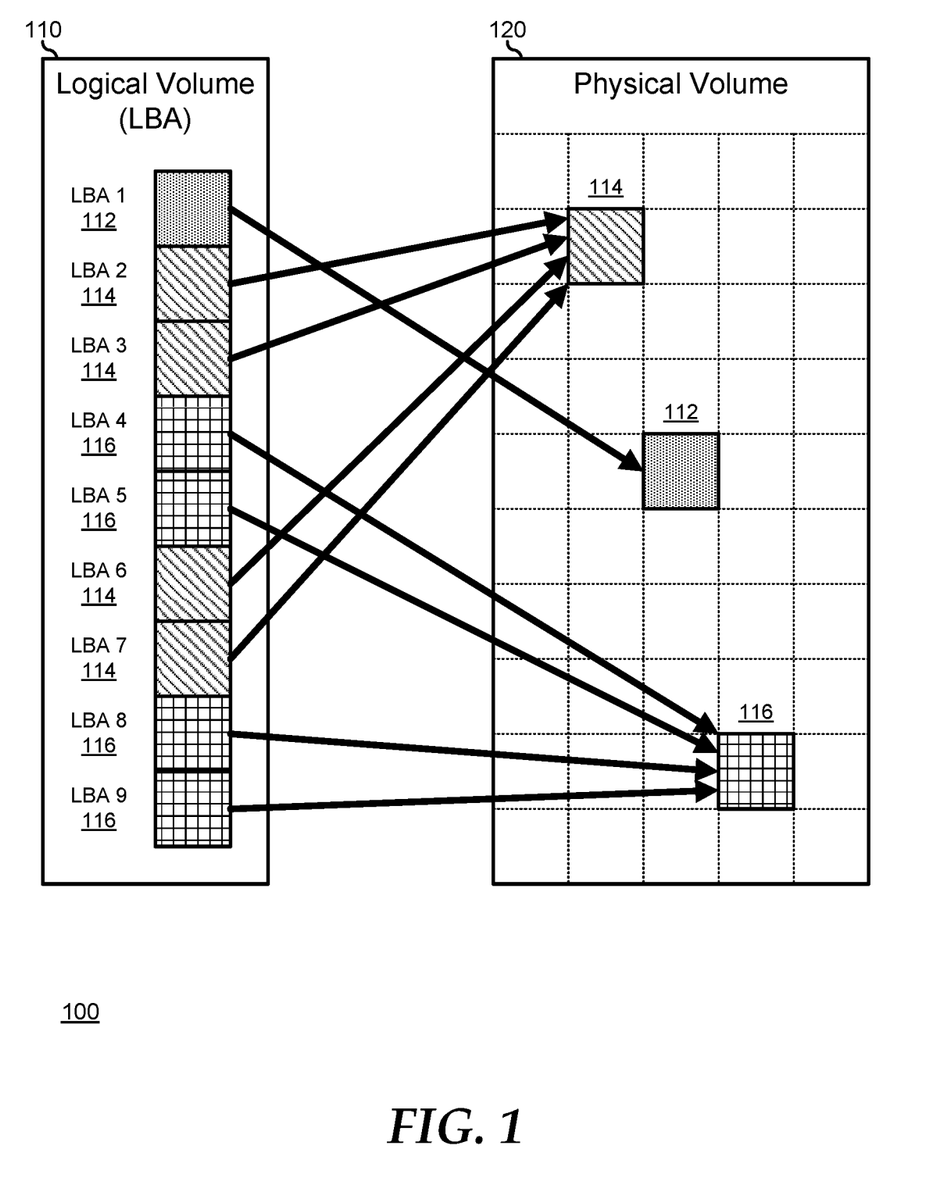
FIG. 1 is a block diagram illustrating a storage array according to an embodiment of the current disclosure.

FIG. 1 illustrates a storage array 100 including a logical block table 110 and a physical storage volume 120. Storage array 100 represents a data storage system for an information handling system, such as for a computer system, a server system, a data center, or other information handling system, as needed or required. For example, storage array 100 may represent a SCSI storage array that is managed by a common SCSI controller, a network attached storage (NAS) device or an array of NAS devices, a storage area network (SAN), a storage server, or the like. As such, physical storage volume 120 may represent a single data storage device, such as a disk drive, a solid state drive (SSD), or other data storage medium, as needed or desired, or may represent multiple data storage devices as needed or desired. As such, the teachings herein are to be understood to apply broadly to any type of data storage as needed or desired.

Logical block table 110 represents a mapping table maintained and utilized by a storage controller associated with storage array 100 that manages data requests from various agents instantiated on the information handling system that utilizes the storage array. In particular, various blocks of data stored on physical storage volume 120, including data blocks 112, 114, and 116, are addressed and accessed by the various agents by calls to various logical blocks (LBA 1-LBA 9) as provided by a virtual memory management system for the information handling system. As illustrated, a first logical block address (LBA 1) of the virtual memory space of the information handling system represents a particular agent's utilization of data block 112 as stored on physical storage volume 120. Similarly, data block 114 is utilized by the various agents by reference to logical block addresses (LBA 2, LBA 3, LBA 6, and LBA 7), and data block 116 is utilized by the various agents by reference to logical block addresses (LBA 4, LBA 5, LBA 8, and LBA 9).

Copying of data from one storage array to another storage array, such as for migration operations, backup operations, data replication operations, and the like, involves the movement of the data blocks from the first storage array to the second storage array, and also involves the recreation of the logical block table from the first storage array to the second storage array, so that the various agents instantiated on the information handling system that utilizes the storage arrays retain the ability to seamlessly access the physical data, without necessitating any remapping of the virtual address space of the information handling system.

Figure 2:
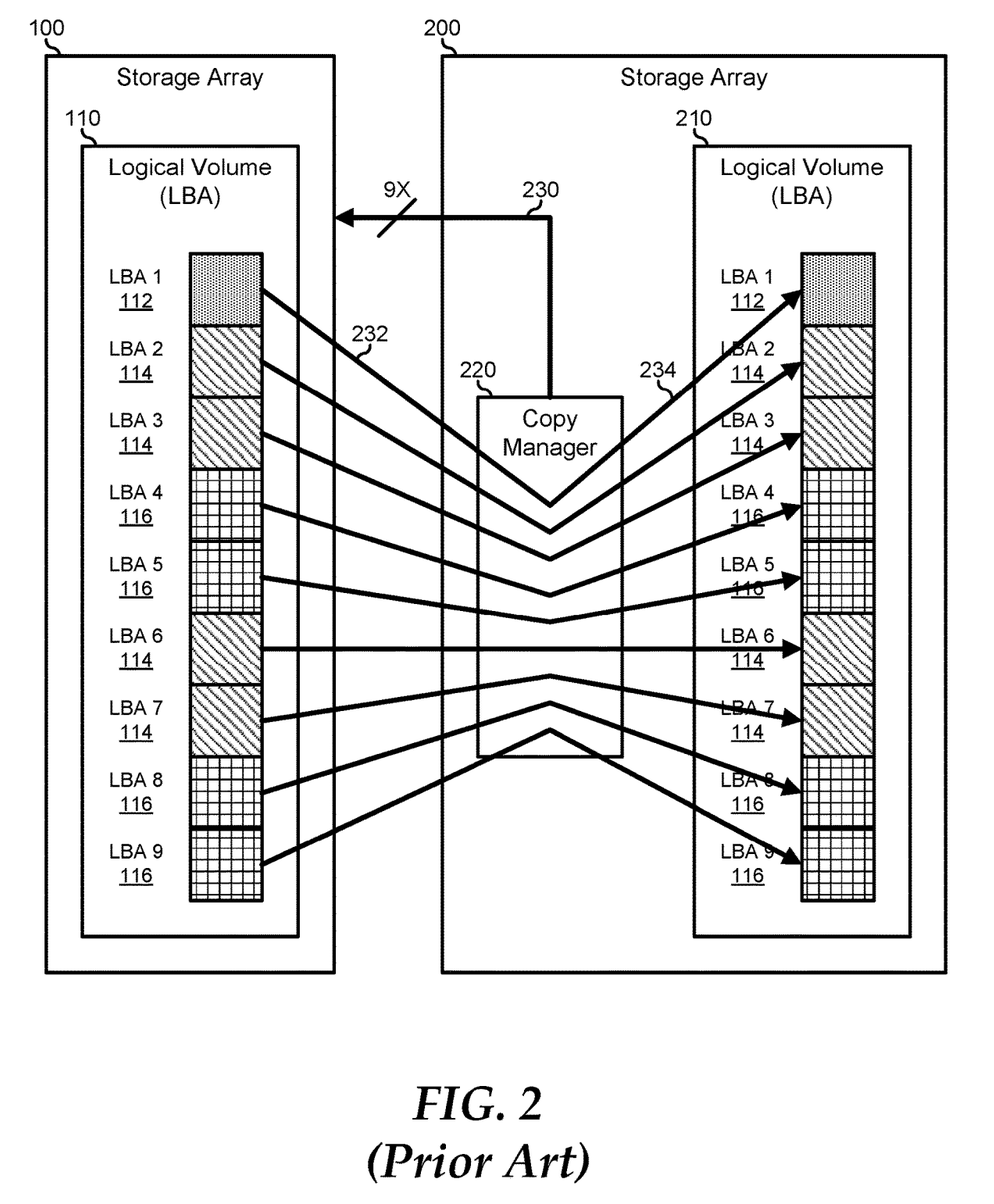
FIG. 2 is a block diagram illustrating a storage array in accordance with the prior art.

FIG. 2 illustrates a storage array copy operation in accordance with the prior art. Here, the data stored on storage array 100 is to be copied to a storage array 200. As such, storage array 200 includes a logical block table 210 and a copy manager 220. Logical block table 210 will be understood to be intended to reflect the logical block mappings of logical block table 110 when the array copy operation is completed. Storage array 200 will be understood to include a physical storage volume similar to physical storage volume 120 as shown in FIG. 1. It will be further understood that the physical storage volume of storage array 200 may have the same storage capacity as physical storage volume 120, or a different storage capacity than physical storage volume 120.

Where the physical storage volume of storage array 200 has a different storage capacity than physical storage volume 120, it will be further understood that if physical storage volume 120 has the larger storage capacity, then other copy mechanisms may be utilized to ensure that the data from physical storage volume 120 that is in excess of the storage capacity of the physical storage volume of storage array 200 is alternately stored to a different storage array. The copying of data between storage arrays in known in the art and will not be further described herein except as needed to illustrate the current embodiments.

When the data from storage array 100 is to be copied to storage array 200, copy manager 220 operates to send a data read command 230 to storage array 100 identifying a logical block address to be copied from storage array 100. Storage array 100 responds by sending 332 the data associated with the logical block address identified in the data read command to storage array 200. Copy manager 220 then writes the data to the physical storage volume of storage array 200, and associates 234 the data with the logical block address in logical block table 210. Here, in order to perform an array copy, a backup, or a data redundancy operation, copy manager 220 will typically start by issuing a data read command for the first logical block address (LBA 1), receive data block 112, write the data block to the physical storage volume of storage array 200, and associate the data block with a new LBA 1 in logical block table 210 that points to location where the data block was stored in the physical storage volume.

Copy manager 220 will proceed similarly through LBA 2-LBA 9, receiving data block 114 four times, once each for logical block addresses LBA 2, LBA 3, LBA 6, and LBA7, and receiving data block 116 four times, once each for logical block addresses LBA 4, LBA 5, LBA 8, and LBA 9. The data received from storage array 100 is as follows:
LBA Data
LBA 1 Block 112
LBA 2 Block 114
LBA 3 Block 114
LBA 4 Block 116
LBA 5 Block 116
LBA 6 Block 114
LBA 7 Block 114
LBA 8 Block 116
LBA 9 Block 116

Here, it can be seen that nine separate data reads are needed to copy the data from storage array 100 to storage array 200, utilizing an excessive amount of processing resources and communication bandwidth in the process.

Figure 3:
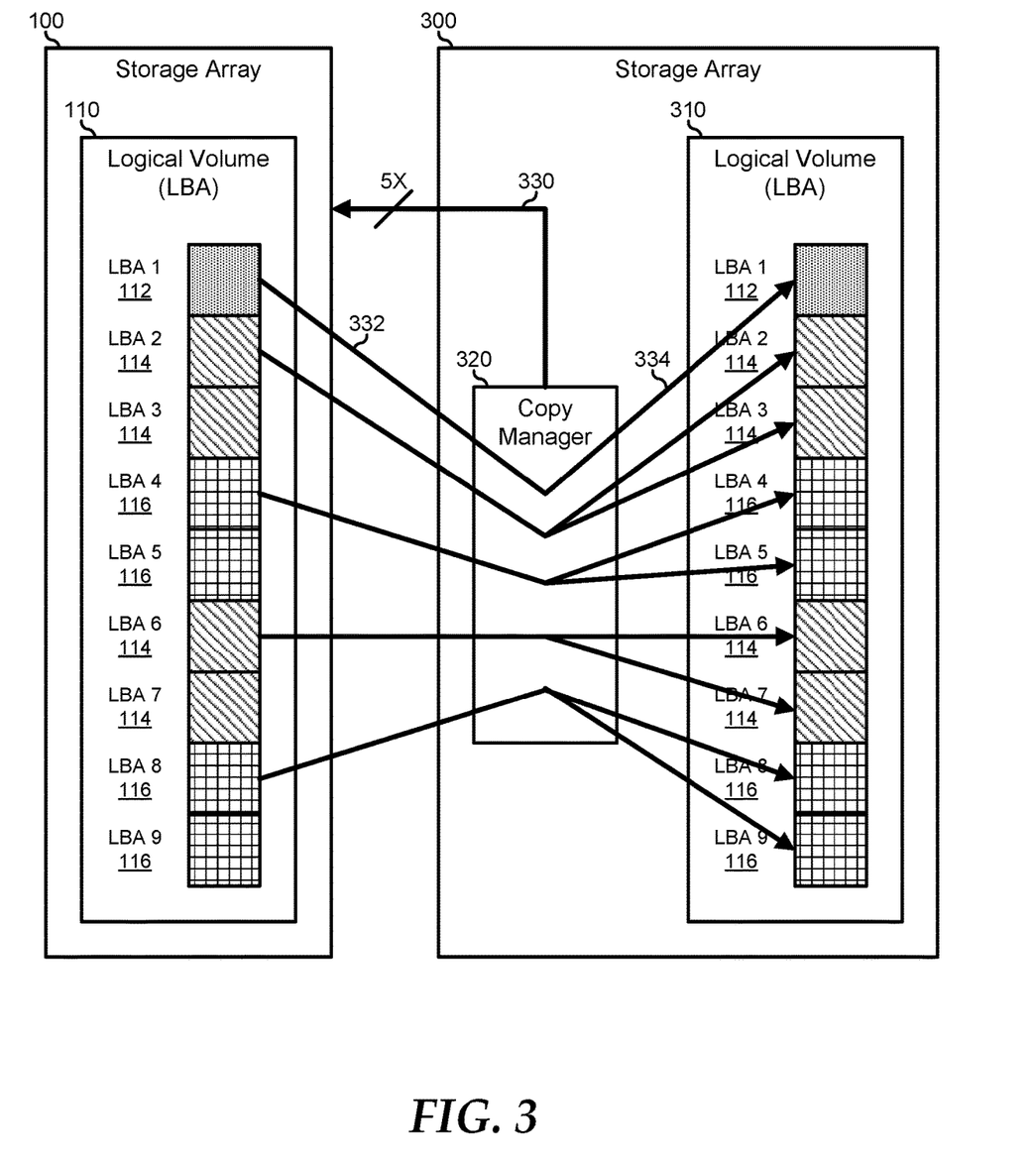
FIG. 3 is a block diagram illustrating a storage system according to an embodiment of the current disclosure.

FIG. 3 illustrates a storage array copy operation in accordance with an embodiment of the current disclosure. Here, the data stored on storage array 100 is to be copied to a storage array 300 similar to storage array 200. As such, storage array 300 includes a logical block table 310 similar to logical block table 210, and a copy manager 320 similar to copy manager 220. Storage array 300 will further be understood to include a physical storage volume similar to physical storage volume 120. Here, storage arrays 100 and 300 each implement a modified data read command that directs the data source storage array to provide logical block table metadata along with the data for each logical block address. The metadata includes the number of contiguous entries in the logical storage table that point to the same data as the currently read data.

When the data from storage array 100 is to be copied to storage array 300, copy manager 320 operates to send a data read command 330 to storage array 100 identifying a logical block address to be copied from storage array 100. Storage array 100 responds by sending 332 the data associated with the logical block address identified in the data read command and the metadata associated with the logical block address to storage array 300. Copy manager 320 then writes the data to the physical storage volume of storage array 300, associates 334 the data with the logical block address in logical block table 310, and associates the data with the number of contiguous logical block addresses in the logical block table as identified by the received metadata.

Here, in order to perform an array copy, a backup, or a data redundancy operation, copy manager 320 will typically start by issuing a modified data read command for the first logical block address (LBA 1), and receive data block 112 with the associated metadata, here one (1), indicating that there are no additional logical block addresses associated with the data block. Copy manager 320 will then write data block 112 to the physical storage volume of storage array 300, and associate the data block with a new logical block address (LBA 1) in logical block table 310 that points to location where the data block was stored in the physical storage volume. Copy manager 320 will then issue a modified data read command for the next logical block address that is associated with different data (here LBA 2), and receive data block 114 with the associated metadata, here two (2), indicating that there is one additional logical block address that is associated with the data block.

Copy manager 320 will then write data block 114 to the physical storage volume of storage array 300, and associate the data block with a number of new logical block addresses (here LBA 2 and LBA 3) in logical block table 310 that each points to location where the data block was stored in the physical storage volume. Copy manager 320 proceeds similarly with modified data reads for LBA 4 (data block 116), LBA 6 (data block 114), and LBA 8 (data block 116). As such, data block 114 is received only two times, once for logical block addresses LBA 2 and LBA 3, and once for logical block addresses LBA 6 and LBA7, and data block 116 is only received two times, once for logical block addresses LBA 4 and LBA 5, and once for LBA 8 and LBA 9. The data received from storage array 100 is as follows:
LBA Data Metadata
LBA 1 Block 112 1
LBA 2 Block 114 2
LBA 4 Block 116 2

LBA 6 Block 114 2
LBA 8 Block 116 2
Here, it can be seen that the copy operation results in only five separate data reads to copy the data from storage array 100 to storage array 300, thereby utilizing less amounts of processing resources and communication bandwidth in the process.

In an alternative embodiment, the metadata does not indicate the number of logical block addresses that refer to common data, but instead includes a number of following logical block addresses that refer to the common data. Thus the data received from storage array 100 in this embodiment is as follows:

LBA Data Metadata
LBA 1 Block 112 0
LBA 2 Block 114 1
LBA 4 Block 116 1
LBA 6 Block 114 1
LBA 8 Block 116 1

In a particular embodiment, the modified read command is provided as an option that is supported within a particular data storage standard, such as a SCSI standard, such that any storage array that is provided in conformance with that standard can support the modified data read operations. In another embodiment, the modified read command is provided as an option that is supported by a particular manufactures equipment, such that only storage arrays that are provided by that manufacturer can support the modified data read operations, providing a value add to users of that manufacturer's products.

Figure 4:
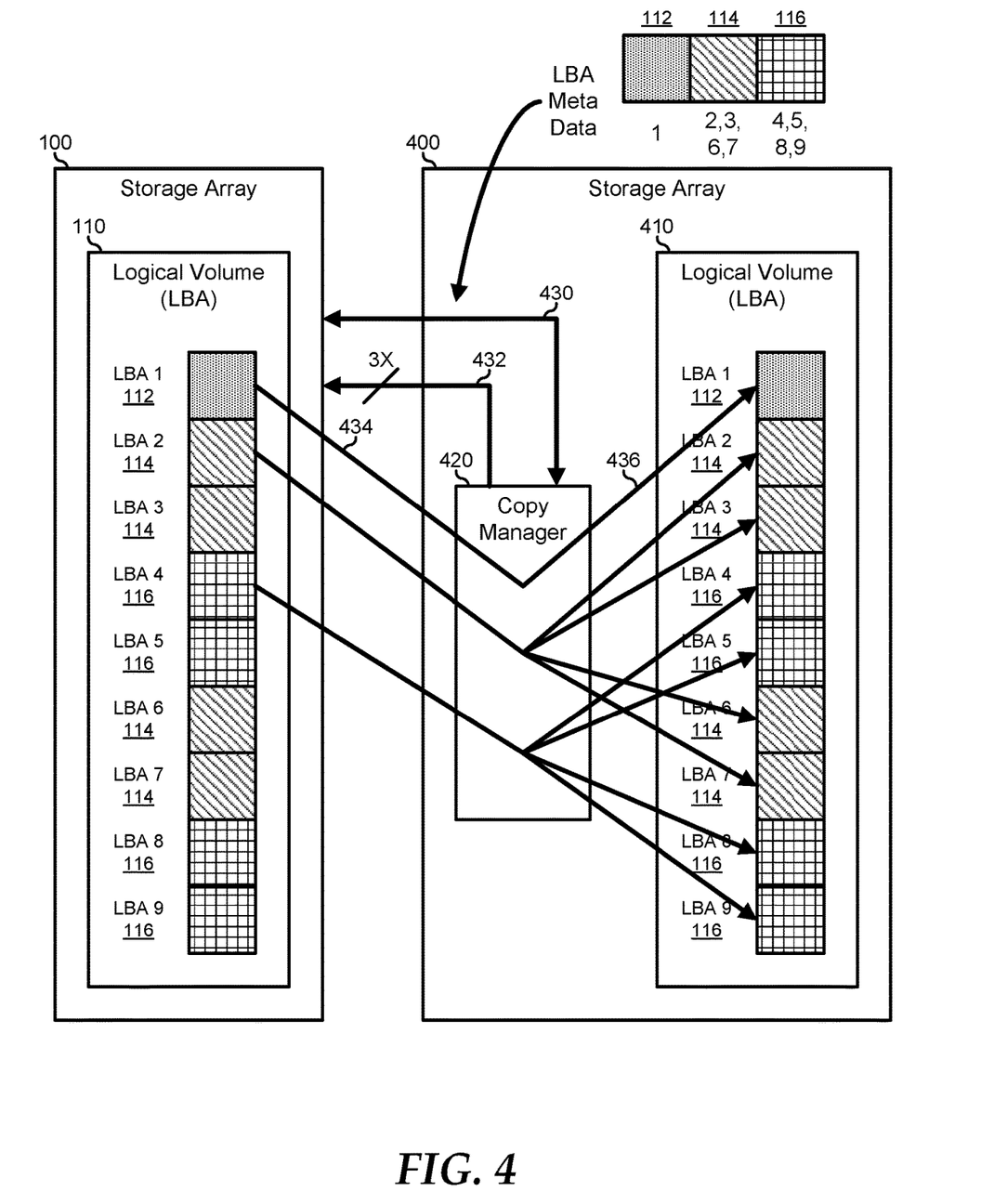
FIG. 4 is a block diagram illustrating a storage system according to another embodiment of the current disclosure.

FIG. 4 illustrates a storage array copy operation in accordance with an embodiment of the current disclosure. Here, the data stored on storage array 100 is to be copied to a storage array 400 similar to storage arrays 200 and 300. As such, storage array 400 includes a logical block table 410 similar to logical block tables 210 and 310, and a copy manager 420 similar to copy managers 220 and 320. Storage array 400 will further be understood to include a physical storage volume similar to physical storage volume 120. Here, storage arrays 100 and 400 each implement a metadata synchronization operation between the storage arrays prior to executing the storage array copy operation. In the metadata synchronization operation, copy manager 420 issues a metadata read command 430 to storage array 100, and storage array 100 provides the metadata that associates each data block with the logical block addresses that point to the data block.

As such, copy manager 420 receives the metadata as shown in the inset of FIG. 4, where data block 112 is associated with LBA 1, data block 114 is associated with LBA 2, LBA 3, LBA 6, and LBA 7, and data block 116 is associated with LBA 4, LBA 5, LBA 8, and LBA 9. Then copy manger 420 evaluates the received metadata and issues data read commands 432 for LBAs that are associated with unique data, here LBA 1, LBA 2, and LBA 4. Storage array 100 sends the data blocks 434 for each data read command, and then copy manager 420 writes the data blocks to the physical storage volume of storage array 400, and recreates logical volume table 110 in logical volume table 410 based upon the received metadata. The metadata received from storage array 100 in this embodiment is as follows:

Data block # LBAs
Block 112 1
Block 114 2, 3, 6, 7
Block 116 4, 5, 8, 9

Note that the metadata does not need to identify the data blocks explicitly, but may simply provide the logical block addresses in a list, and being delimited by a data delimiter that indicates that a new data block pointed to. For example the metadata may include "1/2,3,6,7/4,5,8,9", where the "/" indicates the start of a new set of logical block addresses.

In a particular embodiment, the metadata provided by storage array 100 only includes information on redundant logical block addresses, and not on any logical block addresses that uniquely point to data blocks in the physical storage array. In this way, the amount of data transmitted in the metadata is reduced, particularly in cases where there is little duplication in the logical block addresses. Here, the metadata received from storage array 100 in this embodiment is as follows:

Data block # LBAs
Block 114 2, 3, 6, 7
Block 116 4, 5, 8, 9

Figure 5:
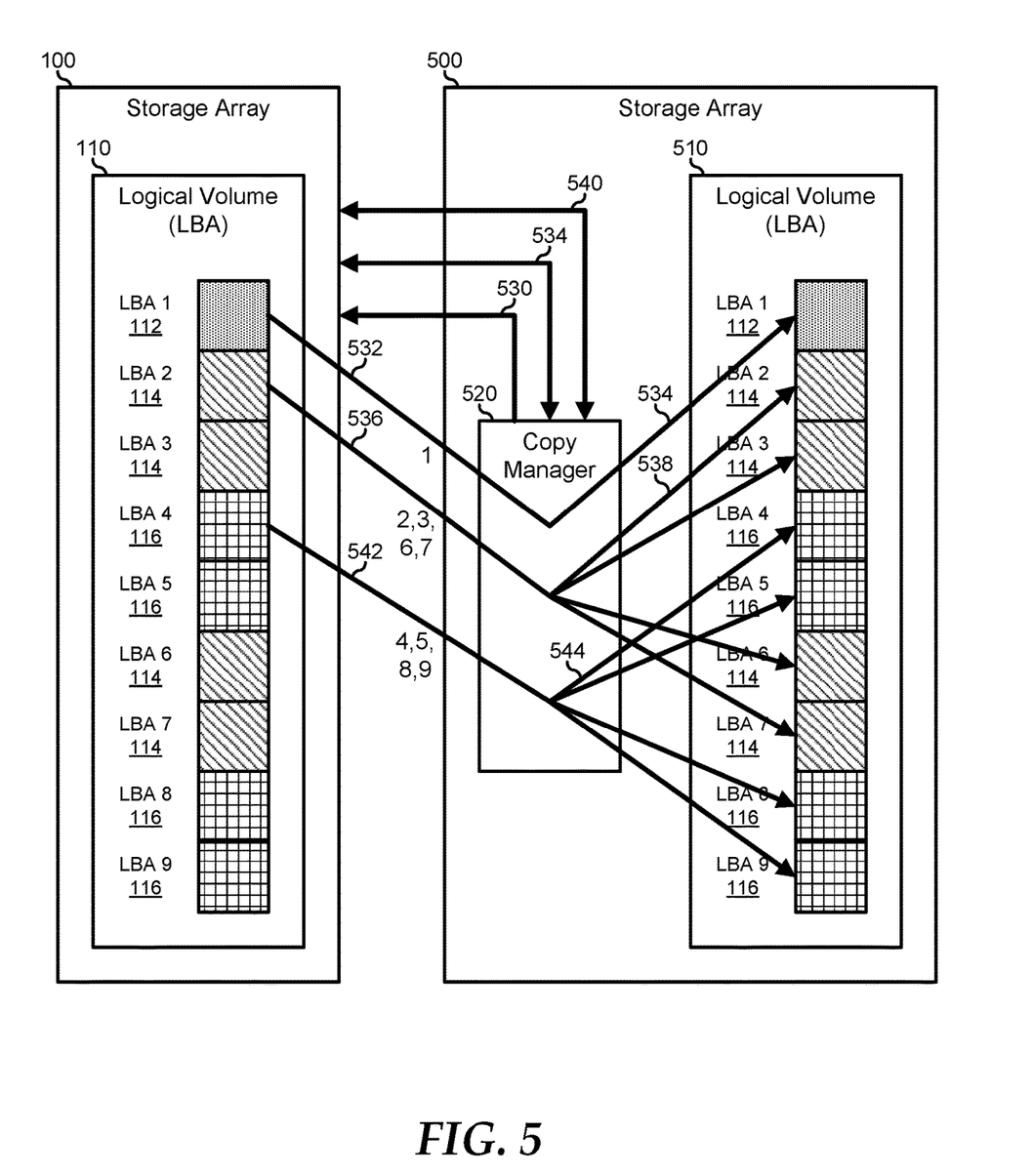
FIG. 5 is a block diagram illustrating a storage system according to another embodiment of the current disclosure.

FIG. 5 illustrates a storage array copy operation in accordance with an embodiment of the current disclosure. Here, the data stored on storage array 100 is to be copied to a storage array 500 similar to storage arrays 200, 300, and 400. As such, storage array 400 includes a logical block table 410 similar to logical block table 210, 310, and 410, and a copy manager 420 similar to copy managers 220, 320, and 420. Storage array 500 will further be understood to include a physical storage volume similar to physical storage volume 120. Here, storage arrays 100 and 500 each implement a modified data read command that directs the data source storage array to provide logical block table metadata along with the data for each logical block address.

The metadata includes all of the logical block addresses in the logical address table that point to the same data as the currently read data. When the data from storage array 100 is to be read, copy manager 520 operates to send a data read command to storage array 100 identifying a logical block address to be copied from storage array 100. Storage array 100 responds by sending the data associated with the logical block address identified in the data read command and the metadata associated with the logical block address to storage array 500. Copy manager 520 then writes the data to the physical storage volume of storage array 500, associates the data with the logical block address in logical block table 510, and associates the data with each of the logical block addresses in the logical block table as identified by the received metadata.

Here, in order to perform an array copy, a backup, or a data redundancy operation, copy manager 520 will typically start by issuing a modified data read command 530 for the first logical block address (LBA 1). Copy manager 520 then receives 532 data block 112 with the associated metadata, here one (1), indicating that only LBA1 points to the data block, and writes 534 the data block to the physical storage volume of storage array 500, and associates the data block with a new logical block address (LBA 1) in logical block table 510 that points to location where the data block was stored in the physical storage volume. Copy manager 520 then issues a modified data read command 538 for the next logical block address that is associated with different data (here LBA 2) and receives 536 data block 114 with the associated metadata, here 2, 3, 6, and 7, indicating that LBA 2, LBA 3, LBA 6, and LBA 7 are each associated with the data block.

Copy manager 520 then write 538 data block 114 to the physical storage volume of storage array 500 and associates the data block with the logical block addresses identified by the metadata. Copy manager 520 finally issues a modified data read command 540 for the next logical block address that is associated with different data (here LBA 4) and receives 542 data block 116 with the associated metadata, here 4, 5, 8, and 9, indicating that LBA 4, LBA 5, LBA 8, and LBA 9 are each associated with the data block. Copy manager 520 then write 544 data block 116 to the physical storage volume of storage array 500 and associates the data block with the logical block addresses identified by the metadata. The data received from storage array 100 is as follows:

LBA Data Metadata
LBA 1 Block 112 1
LBA 2 Block 114 2, 3, 6, 7
LBA 4 Block 116 4, 5, 8, 9

Here, it can be seen that the copy operation results in only three separate data reads to copy the data from storage array 100 to storage array 500, thereby utilizing less amounts of processing resources and communication bandwidth in the process.

Copy managers 320, 420, and 520 each represent an agent of the associated storage arrays 300 and 400 that provide the functions and features as described herein. For example a copy manager may represent a functional blocks within a storage controller of the associated storage array, or may represent a program or module of code configured to perform the described functions and features. Moreover, while the copy managers are illustrated as being in the target storage array, this is not necessarily so, and a copy manager may be provided in a source array that performs write operations to the target storage array in accordance with the functions and features as described herein.

Figure 6:
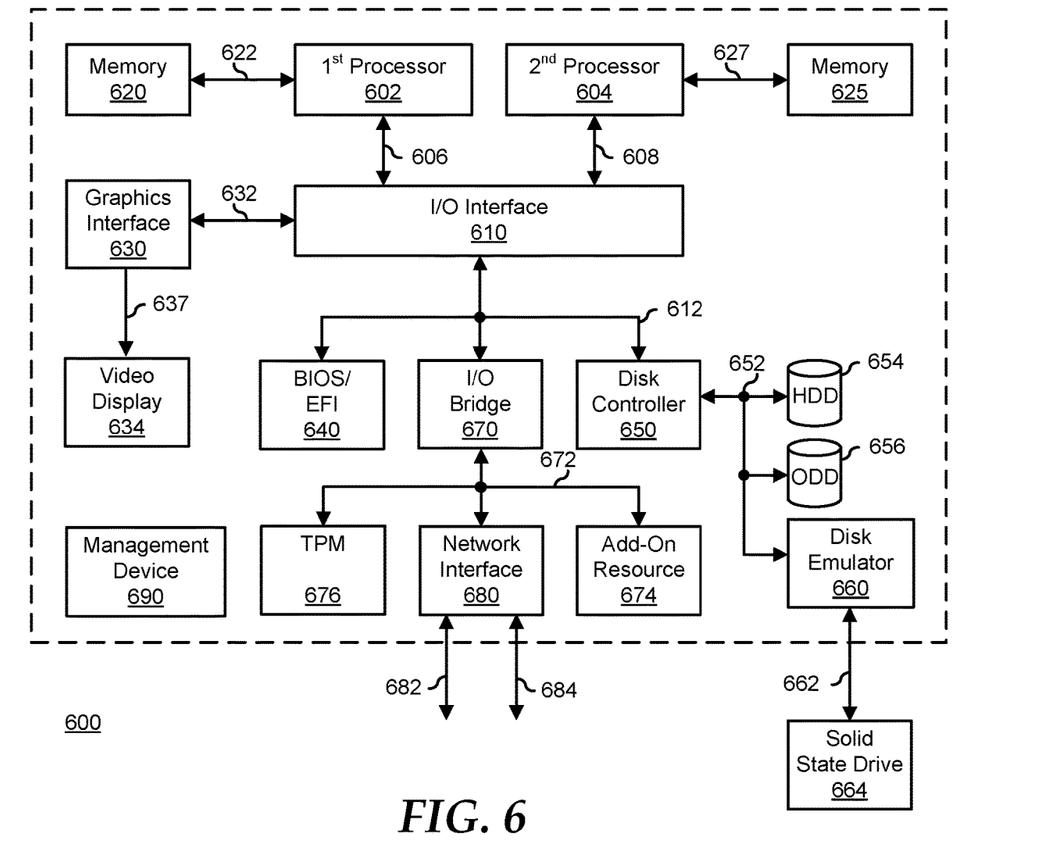
FIG. 6 is a block diagram illustrating a generalized information handling system according to another embodiment of the current disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first storage array including a first logical block table having a plurality of logical block addresses, each logical block address including a pointer to an associated data block in a first storage volume of the first storage array; and
a second storage array including a second logical block table having the plurality of logical block addresses and a second storage volume;
wherein the first storage array is configured to receive a data read command from the second storage array to a first logical block address, and to determine, in response to the data read command, that a data block, which is i) pointed to by the first logical block address and ii) in the first storage volume, is also pointed to by second logical block address that is adjacent to the first logical block address in the first logical block table, and to send the data block and metadata to the second storage array, the metadata indicating that the second logical block address points to the data block.

2. The information handling system of claim 1, wherein the second storage array is configured to receive the data block and the metadata, to write the data block to the second storage volume, to modify the first logical block address in the second logical block table to point to the data block in the second storage volume, and to modify the second logical block address in the second logical block table to point to the data block in the second storage volume.

3. The information handling system of claim 2, wherein the first storage array is further configured to determine that the data block is also point to by a third logical block address that is adjacent to the second logical block address in the first logical block table, the metadata further indicating that the third logical block address points to the data block.

4. The information handling system of claim 3, wherein the second storage array is further configured to modify the third logical block address in the second logical block table to point to the data block in the second storage volume.

5. The information handling system of claim 1, wherein the first metadata indicates a number of consecutive logical block addresses in the second logical block table that each point to the data block in the second storage array.

6. The information handling system of claim 1, wherein the first metadata indicates a number of logical block addresses in the second logical block table that each point to the data block in the second storage array in addition to the first logical block address.

7. The information handling system of claim 1, wherein the first metadata indicates all logical block addresses in the second logical block table that point to the data block in the second storage array.

8. The information handling system of claim 1, wherein the first storage array and the second storage array are SCSI storage arrays.

9. The information handling system of claim 1, wherein the first and second storage volumes include at least one of a disk drive and a solid state drive.

10. A method, comprising:
sending a data read request for data associated with a first logical block address from a second storage array to a first storage array, the first storage array including a first logical block table having a plurality of logical block addresses, each logical block address including a pointer to an associated data block in a first storage volume of the first storage array, and the second storage array including a second logical block table having the logical block addresses and a second storage volume;
determining, in response to the data read request, that the data block, which is i) in the first storage volume and ii) pointed to by the first logical block address, is also pointed to by second logical block address that is adjacent to the first logical block address in the first logical block table; and
sending the data block and metadata to the second storage array, the metadata indicating that the second logical block address points to the data block.

11. The method of claim 10, further comprising:
receiving, by the first storage array, the data block and the metadata;
writing the data block to the second storage volume;
modifying the first logical block address in the second logical block table to point to the data block in the second storage volume; and
modifying the second logical block address in the second logical block table to point to the data block in the second storage volume.

12. The method of claim 11, further comprising:
determining, by the first storage array, that the data block is also point to by a third logical block address that is adjacent to the second logical block address in the first logical block table, the metadata further indicating that the third logical block address points to the data block.

13. The method of claim 12, further comprising:
modifying, by the second storage array, the third logical block address in the second logical block table to point to the data block in the second storage volume.

14. The method of claim 10, wherein the first metadata indicates a number of consecutive logical block addresses in the second logical block table that each point to the data block in the second storage array.

15. The method of claim 10, wherein the first metadata indicates a number of logical block addresses in the second logical block table that each point to the data block in the second storage array in addition to the first logical block address.

16. The method of claim 10, wherein the first metadata indicates all logical block addresses in the second logical block table that point to the data block in the second storage array.

17. The method of claim 10, wherein the first storage array and the second storage array are SCSI storage arrays.

18. The method of claim 10, wherein the first and second storage volumes include at least one of a disk drive and a solid state drive.

19. An information handling system, comprising:
a first storage array including a first logical block table having a plurality of logical block addresses, each logical block address including a pointer to an associated data block in a first storage volume of the first storage array; and
a second storage array including a second logical block table having the logical block addresses and a second storage volume;
wherein the first storage array is configured to receive a metadata request command from the second storage array, and to send, in response to the metadata request command, logical block table metadata to the second storage array, the logical block table metadata identifying the logical block addresses of the first logical block table that point to common data blocks in the first storage volume.

20. The information handling system of claim 19, wherein the second storage array is configured to receive the logical block table metadata, and, in response to receiving the logical block table metadata, to, for each common data block of the common data blocks, send a data read command to the first storage array, receive the common data block, write the common data block to the second storage volume, and modify the logical block addresses, associated with the common data block, in the second logical block table based upon the logical block table metadata.

\* \* \* \* \*